Jan. 23, 1968     K. B. BORGLUM     3,364,913
OUTDOOR FIREPLACE
Filed Aug. 17, 1966
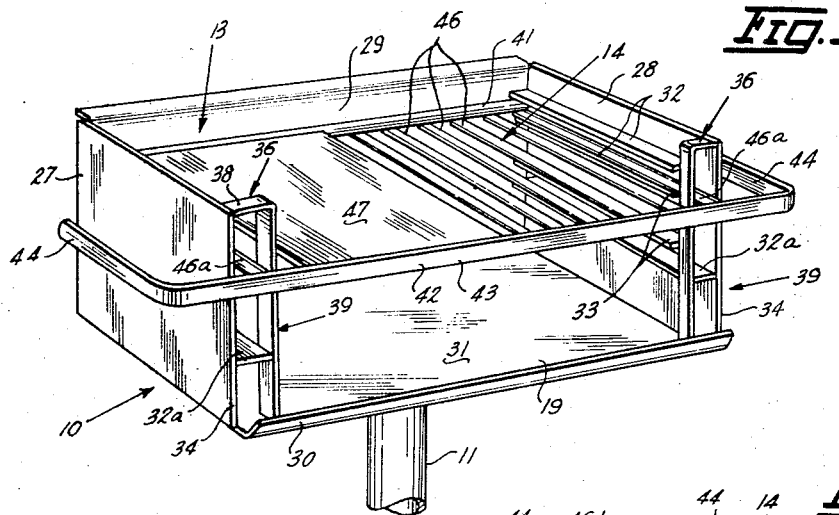
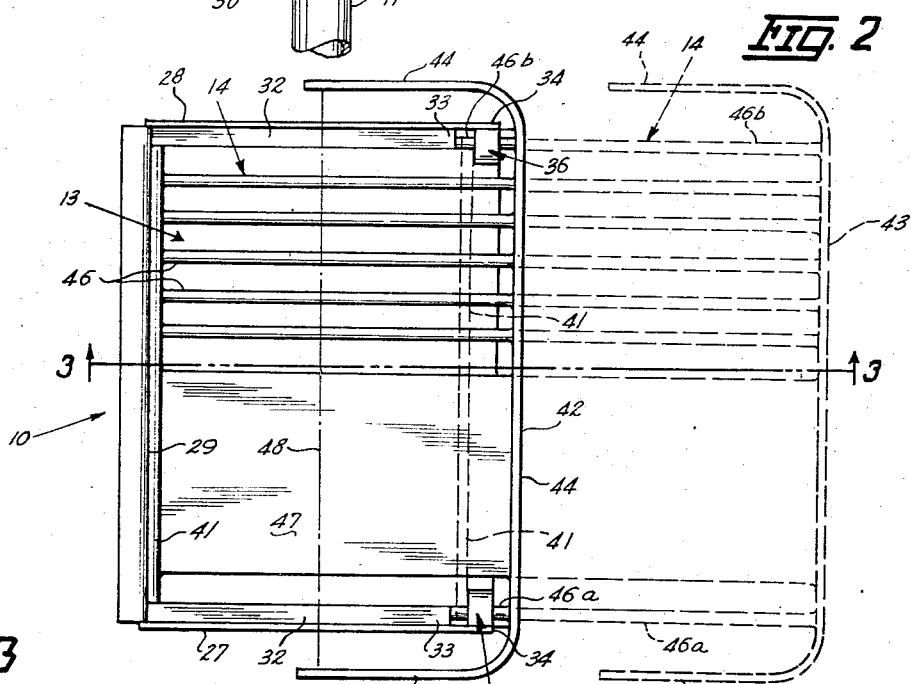
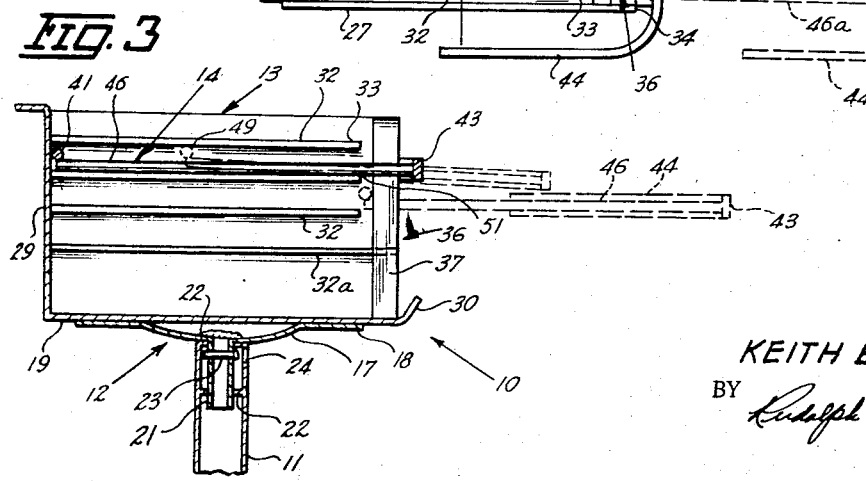
INVENTOR.
KEITH B. BORGLUM
BY
ATTORNEY.

United States Patent Office 3,364,913
Patented Jan. 23, 1968

3,364,913
OUTDOOR FIREPLACE
Keith B. Borglum, Janesville, Iowa 50647
Filed Aug. 17, 1966, Ser. No. 573,082
3 Claims. (Cl. 126—25)

ABSTRACT OF THE DISCLOSURE

An outdoor fireplace has a firebox which includes a rear wall, a pair of side walls and an open front side. A grill structure is horizontally movable into and out of the firebox through the open front side on longitudinally extended vertically spaced support members secured to the inner sides of both side walls. A handle member attached to the front side of the grill is spaced outwardly from and projected rearwardly along each side wall to provide balance and control of the grill for vertical adjustment on the support members while in a forwardly extended position. An upright stop member mounted on each side wall forwardly of the support members engages and locks the grill structure against removal from the firebox, while permitting vertical adjustment of the grill relative to the firebox.

---

This invention relates generally to fireplace structures and more particularly to an outdoor fireplace primarily used for the cooking of food.

An object of this invention is to provide an improved outdoor fireplace.

Another object of this invention is to provide an outdoor fireplace which is readily assembled for use and capable of being rotatable through 360°.

Still another object of this invention is to provide an outdoor fireplace having a firebox with an open front side and a grill structure movably supported for extension and retraction relative to such front side wherein a pair of elongated handle members for the grill structure are extended rearwardly and positioned at opposite sides of the firebox and outwardly therefrom when the grill structure is retracted within the firebox whereby the grill structure may be manually supported in line with its longitudinal axis for handling purposes.

A further object of this invention is to provide an outdoor fireplace having a firebox wherein a grill structure movable to an extended position forwardly of an open front side of the firebox is movably supported on the firebox against tilting movement out of a horizontal plane.

Still another object of this invention is to provide an outdoor fireplace having a firebox and a grill structure supported on the firebox for adjustable vertical movement, and for horizontal movement to retracted and extended positions relative to an open side of the firebox in a vertically adjusted position, wherein coacting means on the firebox and the grill structure are engageable to hold the grill structure against removal from the firebox while permitting such horizontal and vertical movement of the grill structure relative to the firebox.

Further objects, features and advantages of this invention will become apparent from the following description when taken in connection with the accompanying drawing in which:

FIG. 1 is a front perspective view of the fireplace of this invention showing the grill structure in a retracted position within the firebox;

FIG. 2 is an enlarged plan view of the fireplace shown in FIG. 1; and

FIG. 3 is a reduced sectional view of the fireplace taken along line 3—3 in FIG. 2.

Referring to the drawing there is illustrated an outdoor fireplace, indicated generally at 10, having a pivotal device comprised of an elongated pipe section 11, a supporting unit 12 (FIG. 3) rotatably mounted at the upper end of the pipe section 11, a firebox assembly 13 secured to the supporting unit 12 and a grill structure 14 carried on the firebox 13.

The supporting unit 12 (FIG. 3) includes a shaft 16 secured in a depending relation centrally from the bottom of a dish-shaped member 17 the side wall of which terminates in a horizontally extended annular flange 18 that is attached as by welding to the underside of the bottom wall 19 of the firebox 13. The shaft 16 is positioned in a tubular bearing 21 concentrically positioned within the pipe section 11 by a pair of washers 22 vertically spaced within the upper end of the pipe section 11. The upper one of the washers 22 is at the top of the pipe section 11 and constitutes a bearing support for the bottom of the dish-shaped member 17 whereby the firebox 13 is freely rotatable through 360° relative to the pipe section 11. A locking pin 23 movable through an opening 24 in the pipe section 11 is insertable within transversely aligned openings formed in the bearing 21 and the shaft 16 for locking the firebox 13 against removal from the pedestal or pipe section 11.

The firebox 13 is of a rectangular shape having the bottom wall 19 (FIG. 1), a pair of side walls 27 and 28, a rear wall 29 and an open front side 31. The front end of the bottom wall 19 terminates in an upwardly and forwardly inclined lip or guard 30 for retaining hot coals against dropping through the open front side 31.

Carried on the inner side of each side wall 27 and 28 are a plurality of vertically spaced horizontal support members 32 (FIGS. 1 and 3) extended between the rear wall 29 and the open front side 31 but having their front ends 33 spaced inwardly from the forward ends 34 of the side walls. The lowermost support member, indicated as 32a on each side wall 27 and 28 is equal in length to the length of a side wall for a purpose to appear later. The vertical spacing between adjacent support members 32 and 32a is slightly greater than the maximum thickness of the grill structure 14 so as to form guideways for slidably receiving the grill structure therebetween.

Located laterally inwardly from the front end of each side wall 27 and 28 (FIG. 1) is a stop member 36 having an upright section 37 and a top lateral section 38. An upright section 37 is of a length equal to the width of the side walls 27 and 28 and is secured at its lower end as by welding to the bottom wall 19. A lateral section 38 is secured to an adjacent corresponding side wall. A stop member 36 in conjunction with those portions of the bottom wall 19 and side walls 27 and 28 directly opposite the upright and lateral sections 37 and 38 thereof forms a closed loop, indicated generally as 39, at each end of the open front side 31.

The distance between each upright section 37 and an adjacent side wall 27 and 28 is substantially equal to the width of the support members 32 and 32a. As shown in FIG. 3 the forward ends 33 of the support members 32 are spaced rearwardly from the stop members 36 while the lowermost support members 32a have their forward ends positioned within and secured to the sides of the closed loops 39.

The grill structure 14 (FIGS. 2 and 3) includes a rear member 41 of a round rod construction extended longitudinally of the firebox 13 between the side walls 27 and 28 so that the opposite ends thereof are receivable between adjacent support members 32 and 32a. A front member 42 (FIGS. 1 and 2), of a generally U-shape in top plan view, is formed of a bar material so as to have a central or base section 43 and rearwardly extended leg or handle sections 44. The base section 43 is of a length greater than the longitudinal length of the firebox 13 so that the handle sections 44 are spaced outwardly from corresponding side walls 27 and 28 of the firebox.

The rear member 41 and base section 43 over a portion of their lengths are connected together by transverse longitudinally spaced connecting members 46 of a rod construction. Over the remaining portions of their lengths the rear member 41 and base section 43 are connected together by a flat plate member 47. The front ends of the connecting members 46 are secured to the rear side of the base section 43 and their rear ends (FIG. 1) underlie the rear member 41 for securement to the under side thereof. The plate member 47 has its front end secured to the rear side of the base section 43 and its rear end secured to the front side of the rear member 41. A single connecting member, indicated at 46a, is located to the outside of the plate member 47 (FIGS. 1 and 2) so as to be at one end of the grill structure 14. The connecting member 46a and the connecting member indicated as 46b, at the opposite end of the grill structure 14, are extended through corresponding loop members 39 so as to lock the grill structure 14 against removal from the firebox 13.

In the assembly of the grill structure 14 with the firebox 13, the grill structure is supported on tranversely opposite supporting members 32 and positioned within the firebox 13 after which the stop members 36 are arranged as shown in FIG. 1 and then secured as by welding to the firebox 13 and to the lower support members 32a.

As best shown in FIG. 2 the connecting members 46 and the flat plate member 47 are of a length such that when the grill structure 14 is within the firebox 13, wherein the rear member 41 is adjacent the rear wall 29, the base section 43 of the front member 42 is spaced forwardly from the front open side 31 of the firebox. It is to be noted further that the end or handle sections 44 of the grill structure 14 are extended rearwardly in a spaced parallel relation with adjacent side walls 27 and 28. Each handle section 44 is of a length greater than one-half of the width of the grill structure 14, or the depth of the firebox 13, so that the grill structure may be gripped at a position in line with the longitudinal axis thereof indicated at 48 in FIG. 2. As a result of such gripping positions the grill structure 14 is capable of being supported in a balanced condition to facilitate its handling and movement relative to the firebox 13.

In use assume the grill structure 14 to be in its innermost position within the firebox 13 as shown in FIGS. 1 and 2. On movement of the grill structure outwardly from the open side 31 of the firebox the grill structure is retained in a substantially horizontal position by the contact engagement of an end of the rear member 41 with an adjacent upper support member 32 at a point 49 as shown in FIG. 3. Likewise the outer connecting members 46a and 46b are in contact engagement with adjacent lower support members 32 at points 51 thereon immediately above the upper forward edges 33 of such adjacent support members 32. In this respect it is to be noted that the rear member 41 and a connecting member 46 have a combined thickness or vertical height which is substantially equal to the vertical spacing between adjacent support members 32 and 32a.

To vary the horizontal position of the grill structure 14 relative to the bottom wall 19 of the firebox, the grill structure, while gripped at the handle sections 44, is moved to its forwardmost position, shown in dotted lines in FIGS. 2 and 3 wherein the rear member 41 is against the stop members 36 and within the vertically extended space between the front ends 33 of the support members 32 and the rear sides of the stop members 36. In this position the rear member 41 is freely movable within such vertical space for insertion in a rearward direction between a selected pair of adjacent support members 32 and 32a. During this manipulation downward movement of the grill structure 14 is limited by engagement with the projected forward ends of the lower support members 32a; forward movement by the upright sections 37 of the stop members 36, and upward movement by the lateral extensions 38 of the stop members 36.

Although the invention has been described with respect to a preferred embodiment thereof it is to be understood that it is not to be so limited since changes can be made therein which are within the full intended scope of this invention as defined by the appended claims.

I claim:
1. An outdoor fireplace comprising:
   (a) a firebox having a rear wall, a pair of side walls and an open front side,
   (b) a grill structure,
   (c) a plurality of support members carried in a vertically spaced relation on each of said side walls with the front ends thereof spaced rearwardly from said open front side for supporting said grill structure for horizontal movement into and out of said firebox through said open front side, with a support member on one side wall being in a plane common to the support member on the other side wall,
   (d) a front member on said grill structure including an intermediate section extended longitudinally along the forward side of said grill structure and positioned outwardly from said open side when the grill structure is within said firebox,
   (e) handle sections projected laterally rearwardly from the ends of said intermediate section, each end section having a length equal to at least one half the width of said grill structure and arranged to the outside of said pair of side walls when the grill structure is within said firebox,
   (f) a rear member on said grill structure, connected to said front member by a plurality of rod members arranged in a parallel spaced relation transversely of said front and rear members, and
   (g) an upright locking means mounted on each side wall forwardly of said supporting members engageable with said rear member to lock the grill structure against removal from the firebox, and to provide for the vertical adjustment of the grill structure on said side walls.
2. An outdoor fireplace comprising:
   (a) a firebox having a rear wall, a pair of side walls and an open front side,
   (b) a plurality of longitudinally extended support members carried in a vertically spaced relation on the inner surface of each side wall with the front ends thereof spaced rearwardly from said open front side, and with a support member on one side wall being in a plane common to the support member on the other side wall,
   (c) a grill structure having end portions movably supported on said support members to provide for the horizontal movement of said grill structure into and out of said firebox through the open front side thereof, said grill structure including a front member and a rear member connected together by a plurality of rod members arranged in a parallel spaced relation transversely of said front and rear members,
   (d) an upright stop member of a closed loop shape mounted on each side wall forwardly of the support members thereon,
   (e) with a rod member at each end of the grill means being movable through a corresponding one of said stop members on movement of the grill structure into and out of said firebox,
   (f) said rear member being vertically movable between the front ends of said support members when the grill structure is forwardly extended, to provide for the vertical adjustment of the grill structure on said side walls, with the engagement of the rear member with the stop members acting to lock the grill structure against removal in a forward direction from the firebox and engagement of said end rod members with the upper ends of said stop members locking the grill structure against removal in an upward direction from said firebox, and (g) a handle member secured to each end of the front side of said grill structure.

3. An outdoor fireplace according to claim 2 wherein:

(a) the vertical space between adjacent ones of said support members is slightly greater than the combined thickness of said rear member and one of said rod members whereby said grill structure is held against horizontal tilting movement when extended forwardly from said firebox.

References Cited

UNITED STATES PATENTS

| | | | |
|---|---|---|---|
| 2,831,098 | 4/1958 | Luscher | 126—337 |
| 3,053,245 | 9/1962 | Beller | 126—25 |
| 3,096,706 | 7/1963 | Cardwell | 126—25 X |
| 3,304,929 | 2/1967 | Brunig | 126—25 |

JAMES W. WESTHAVER, *Primary Examiner.*

FREDERICK, L. MATTESON, JR., *Examiner.*

E. G. FAVORS, *Assistant Examiner.*